Nov. 23, 1926.

R. H. RAUSCH

CONTROL SYSTEM

Filed August 4, 1923   3 Sheets-Sheet 1

1,608,426

INVENTOR.
R. H. Rausch.
BY
Wayne B. Wells
ATTORNEY.

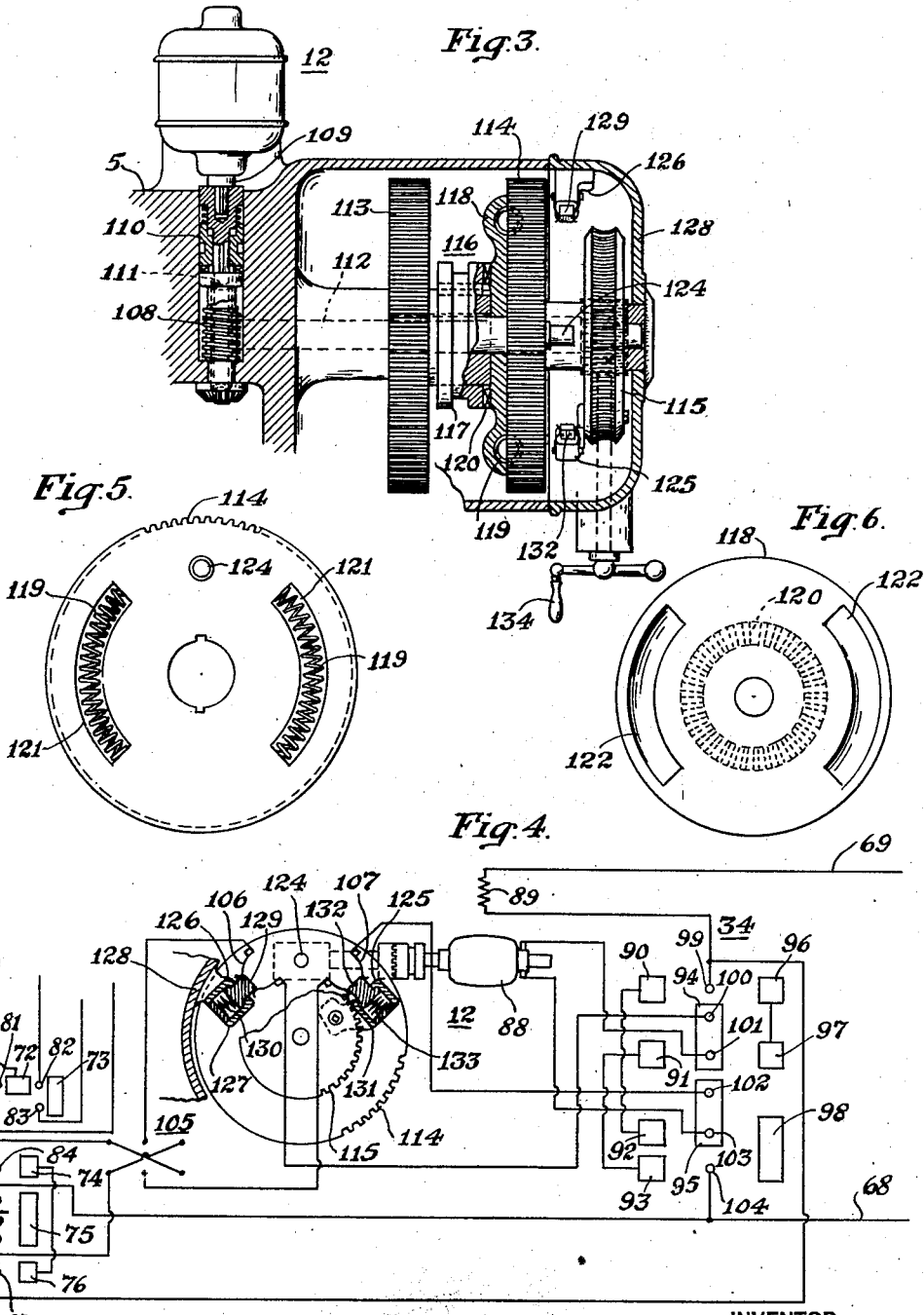

Nov. 23, 1926.　　　　　　　　　　　　　　　1,608,426
R. H. RAUSCH
CONTROL SYSTEM
Filed August 4, 1923　　　　3 Sheets-Sheet 3
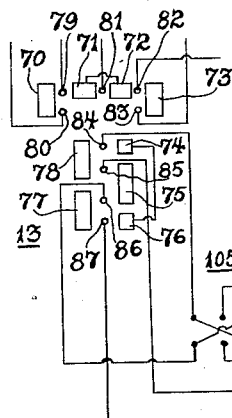
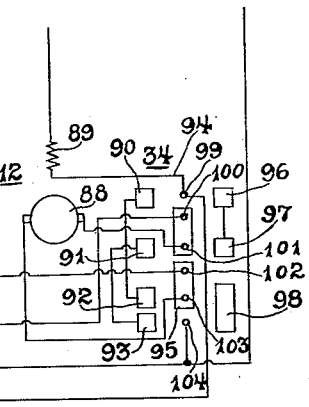
Fig. 7.
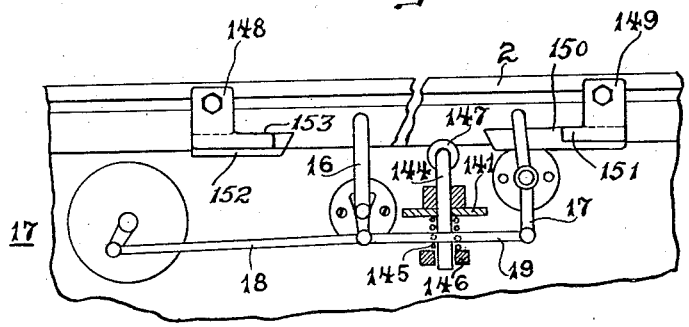
Fig. 8.
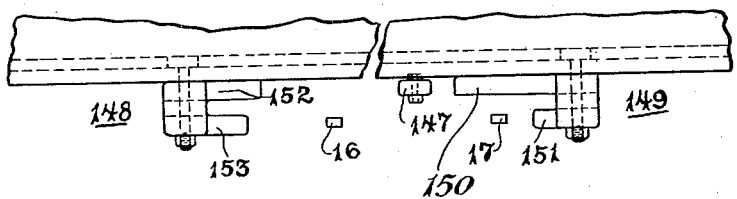
Fig. 9.
INVENTOR.
R. H. Rausch.
BY Wayne B Wells
ATTORNEY Patented Nov. 23, 1926.

1,608,426

UNITED STATES PATENT OFFICE.

ROSWELL H. RAUSCH, OF PLAINFIELD, NEW JERSEY, ASSIGNOR TO NILES-BEMENT-POND COMPANY, OF NEW YORK, N. Y., A CORPORATION OF NEW JERSEY.

CONTROL SYSTEM.

Application filed August 4, 1923. Serial No. 655,738.

My invention relates to control systems and particularly to control systems for governing the operation of planers and other machine tools of like character.

One object of my invention is to provide a control system that shall mechanically stop an auxiliary motor and open the circuit thereof before the end of each movement of a periodically operated member and that shall close the circuit of the auxiliary motor at each end of the movement of the periodically operated member.

Another object of my invention is to provide a control system for a machine tool that shall mechanically stop the feed motor and open the circuit thereof before the end of the stroke of a reciprocating member and that shall reverse the direction of rotation of the main motor for operating the reciprocating member while closing the circuit of the feed motor to effect operation of such motor in a reverse direction.

A further object of my invention is to provide a planer control system that shall effect traverse operation of the feed motor in a forward and in a reverse direction, that shall mechanically stop the feed motor and open the circuit thereof before each end of the stroke of the planer table during feeding operation, and that shall reverse the direction of rotation of the main motor for operating the reciprocating member and close the circuit of the feed motor to effect operation of such motor in a reverse direction.

In operating many machine tools and particularly in operating planers, it is customary to provide a main motor for operating the work carrying table and to provide an auxiliary or feed motor for effecting the traversing and feeding operation of the cutting tool. In the planer control systems now in service, a pilot switch is generally operated by the reciprocating table for reversing the direction of rotation of the main motor and also for controlling the operation of the feed motor during feeding movements. The pilot switch generally closes the circuit of the feed motor to effect a feeding operation while an auxiliary switch called a limit switch is provided for limiting the movement of such motor and accordingly to limit the feeding movement.

In a control system constructed in accordance with my invention, a pilot switch is provided for reversing the direction of rotation of the main motor at each end of the stroke of the planer table and for closing the circuit of the feed motor. The feed motor is mechanically stopped before the end of the stroke of the planer table to limit the feeding movement. Moreover, at the time of mechanically stopping the feed motor, the circuit therefor is opened in any suitable manner. The circuit of the feed motor is held open until the end of the stroke of the planer table. At the end of each stroke of the planer table, the pilot switch completes a circuit through the feed motor for operating it in a reverse direction. A traverse switch is provided for effecting traverse operation of the feed motor in a forward and in a reverse direction. In the central or off position of the traverse switch, the feed motor is connected in circuit with the pilot switch to be operated in accordance with the movement of the reciprocating member. In the positions adjacent to the central position of the traverse switch, the pilot switch is excluded from the feed motor circuit and continuous movement of the feed motor is effected in either direction.

The control system disclosed in this application is closely related to the control system disclosed in the application of Harold L. Blood, Serial No. 641,164 filed May 24, 1923 and is adapted to operate a planer similar to the planer disclosed in the application of H. L. Blood et al. Serial No. 650,421, filed July 9, 1923.

In the accompanying drawings;

Fig. 3 is a sectional view illustrating one mechanism for mechanically stopping the feed motor.

Fig. 4 is a view of the circuits completed through the switches operated by the stop members.

Fig. 5 is an end view of the feed gear.

Fig. 6 is an end view of the clutch member which is adjacent to the feed gear.

Fig. 7 is a diagrammatic view of a modification of my invention.

Figs. 8 and 9 are diagrammatic side and plan views of the dogs for operating the auxiliary switch.

Figure 1:
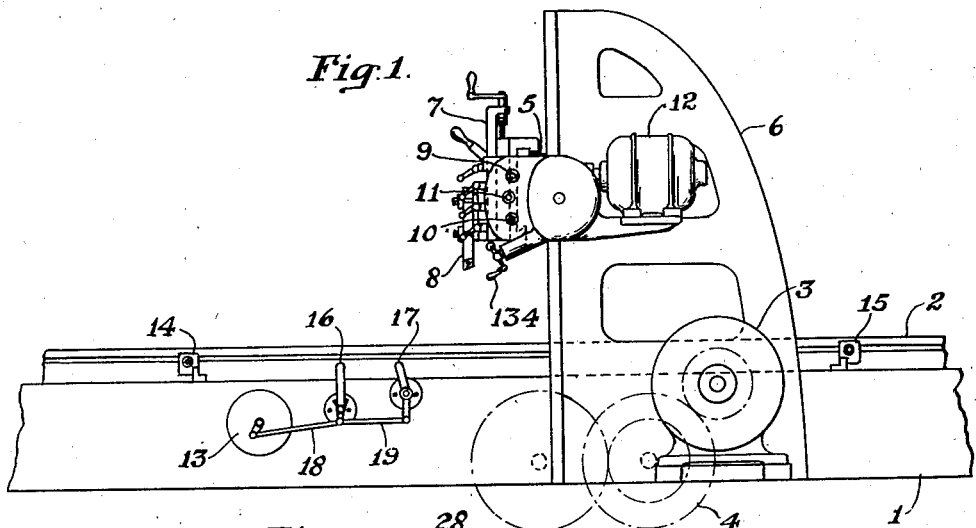
Figure 1 is a fragmentary side elevational view of a planer adapted to be operated by a control system embodying my invention.

Referring to Fig. 1 of the drawings, the bed 1 of a planer supports a reciprocating work carrying table 2 which is preferably operated by means of a main motor 3. The main motor 3 is connected to the reciprocating table 2 by any suitable gearing 4 and is operated in a manner to be hereinafter set forth. A cross rail 5, which is mounted on uprights 6, carries one or more tool heads 7. Suitable cutting tools 8 are carried on the heads 7. The customary shafts 9 and 10 are provided for moving the heads 7 along the cross rail 5 and a shaft 11 is provided for effecting vertical movement of the heads on such rail. A feed motor 12, which is mounted on the cross rail, is connected to the shafts 9, 10 and 11 as set forth in the copending application of H. L. Blood et al. Serial No. 650,421. Inasmuch as a detailed description of the mechanical connections of the feed motor 12 to the various parts of the planer mechanism is given in the copending application, a detailed description of such mechanism in this application is deemed unnecessary.

A pilot switch 13, which is mounted on the side of the bed 1, is adapted to control the operation of the main motor 3 and the feed motor 12 in accordance with the movement of the reciprocating work carrying table 2. The pilot switch 13 is operated by two adjustable dogs 14 and 15, which are mounted on the table 2. The dogs 14 and 15 are adapted to engage levers 16 and 17 at the ends of the planer stroke. The levers 16 and 17 are connected to the pilot switch by means of links 18 and 19. At the end of the cutting or forward stroke, the dog 14 engages the lever 16 for reversing the position of the pilot switch and at the end of the return stroke, the dog 15 engages the lever 17 for changing the position of the pilot switch. The direction of rotation of the main motor 3 and of the feed motor 12 is reversed at each end of the planer stroke.

Figure 2:
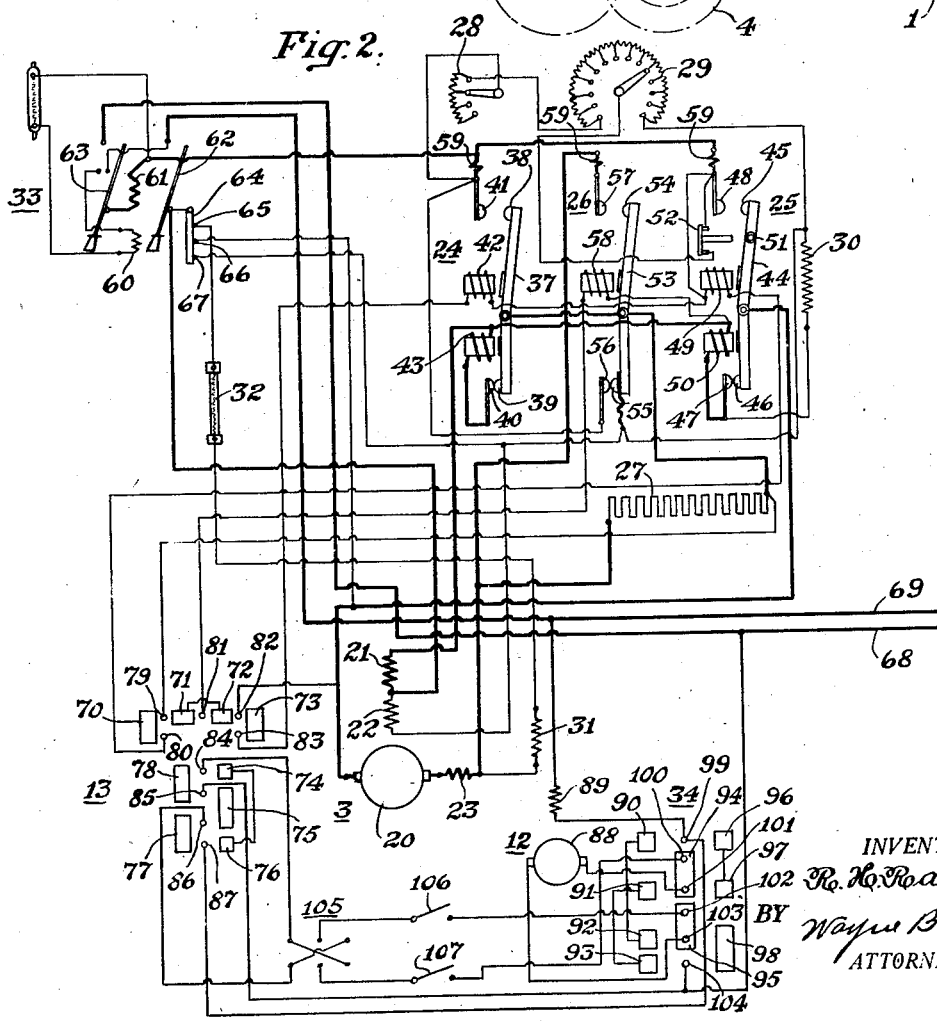
Fig. 2 is a diagrammatic view of a control system embodying my invention.

Referring to Fig. 2 of the drawings, the main motor 3 comprises an armature 20, a series field magnet winding 21, a shunt field magnet winding 22, and an interpole winding 23. The motor 3 is controlled by two unit switches 24 and 25. The unit switch 24 is operated to effect movement of the table 2 in a forward or cutting direction and the unit switch 25 is operated to effect a return movement of the table 2. The unit switches 24 and 25, when in released position, serve to complete a dynamic braking circuit through the motor 3.

An accelerating switch 26 is provided for short circuiting a resistor 27 to effect acceleration of the main motor 3. Two resistors 28 and 29 are provided in the circuit of the shunt field magnet winding 22 to vary the speed of the main motor 3 according to the direction of rotation thereof. A choke resistance 30 is provided in the circuit of the shunt field magnet winding for protecting such winding against induction discharges. Moreover, the main motor is provided with an emergency winding 31, which is connected in circuit with an emergency resistor 32 upon opening of the circuit breaker by reason of an overload or low voltage circuit condition.

An underload and overload circuit breaker 33 of any suitable type is provided in circuit with the feed motor 12 and the main motor 3. The feed motor 12 is not only controlled by the pilot switch 13 but is adapted to be controlled by a traverse switch 34.

The unit switch 24 comprises a pivotally mounted switch arm 37 which carries two contact members 38 and 39. The contact member 39 engages a stationary contact member 40 when the switch is in released position. The contact member 38 engages a stationary contact member 41 when the switch is in an operative position. A main magnet 42 is provided for operating the switch arm 37 and an auxiliary or holding magnet 43 is provided not only to prevent the operation of the unit switch 24 when the unit switch 25 is operated but also to prevent the operation of the unit switch 24 when a dynamic braking current is flowing through the main motor 3.

The unit switch 25 comprises a pivotally mounted switch arm 44, which carries two contact members 45 and 46. The contact member 46 is adapted to engage a stationary contact member 47 when the switch arm is in a released position, as shown in Fig. 2 of the drawings. The contact member 45 is adapted to engage a stationary contact member 48 when the switch arm is in an operative position. A main magnet 49 is provided for operating the switch arm 44 in accordance with the operation of the pilot switch 13 by the table 2. A holding coil 50, similar to the holding coil 43, is provided for preventing the operation of the unit switch 25 when the unit switch 24 is operated and also for preventing operation of the unit switch 25 when a dynamic braking current is flowing through the main motor.

A pin 51, which projects from the side of the switch arm 44, is adapted to open a switch 52 upon operation of the unit switch 25. If the accelerating switch 26 is in an operative position upon operation of the switch 52, the resistors 28 and 29 are inserted in circuit with the shunt field magnet winding 22 of the main motor. The resistors 28 and 29 are inserted in the shunt field magnet winding to increase the speed of the return stroke of the planer table.

The accelerating switch 26 comprises a pivotally mounted switch arm 53 which carries two contact members 54 and 55. The contact member 55 is insulated from the switch arm 53 and is adapted to engage a stationary contact member 56 when the switch arm is in a released position. The contact member 54 is adapted to engage a stationary contact member 57 when the switch arm is in an operative position. A main magnet 58 is provided for operating the switch arm 53 to short circuit the resistor 27. Three blow-out coils 59 are provided for extinguishing the arcs formed by the upper contact members of the main unit switches 24 and 25 and the accelerating switch 26.

The circuit breaker 33 embodies a low voltage coil 60, an overload coil 61 and two switch blades 62 and 63. A switch arm 64 is provided, which serves to bridge contact members 65, 66 and 67 upon release of the circuit breaker. The circuit breaker is connected to a supply circuit comprising conductors 68 and 69. The pilot switch 13 comprises contact segments 70 to 78, inclusive, which are adapted to engage contact fingers 79 to 87, inclusive, for controlling the operation of the main motor 3 and the feed motor 12. The feed motor 12 comprises an armature 88 and a field magnet winding 89.

The traverse switch 34 comprises contact segments 90 to 98, inclusive, which are adapted to engage contact fingers 99 to 104, inclusive. If desirable, a second traverse switch may be provided which would be mounted upon the opposite end of the rail 5. In the copending application of Harold L. Blood, Serial No. 641,164 filed May 24, 1923, the connections of a second traverse switch are illustrated and described. A suitable reversing switch 105 is inserted in the circuit of the feed motor 12. Two switches 106 and 107 are connected in the circuit of the pilot switch 13 and the feed motor 12 for opening the circuit of the motor 12 when such motor is mechanically stopped to limit the feed movement.

Referring to Fig. 3 of the drawings, the mechanism for mechanically stopping the feed motor 12 before each end of the stroke of the planer table is illustrated. The motor 12, which is suitably mounted on the rail 5 of the planer, carries a worm member 108 on an armature shaft 109. The worm member 108 is rotatably mounted on the shaft 109 and is adapted to be connected thereto by means of a clutch member 110. A worm wheel 111, which is mounted on a shaft 112, meshes with the worm member 108. The shaft 112 carries a traverse gear 113, a feed gear 114, and an adjusting worm gear 115. The feed gear 114 is rotatably mounted on the shaft 112 and is adapted to be connected thereto by means of a clutch mechanism 116.

The clutch mechanism 116 comprises a clutch member 117, which is keyed to and slidably mounted on the shaft 112. A second clutch member 118, which is resiliently connected to the gear wheel 114 by means of springs 119, is adapted to be connected to the clutch member 117 by means of clutch teeth 120. The springs 119, which serve to connect the clutch member 118 to the gear wheel 114, are disposed in recesses 121, which are formed in the gear wheel 114, and corresponding recesses 122 which are formed in the clutch member 118. The resilient connection is provided in order to take up the shock of mechanically stopping the motor to limit each feeding movement. The clutch mechanism 116 is provided in order to disconnect the feed gear 114 from the motor 12 when a traversing operation is being effected. The gear wheel 114 carries an insulated stop member 124 which is adapted to operate between an adjustable stop 125 and a fixed stop 126. The engagement between the stop 124 and the stop 126 serves to open the switch 106 and the engagement between the stop 124 and the stop 125 serves to open the switch 107. The fixed stop 126 comprises a base portion 127 and a movable plunger 129 which is movable in the base member 127. The base portion 127 is mounted on the casing 128 which projects from the rail 5. A spring member 130 is provided for normally holding the plunger 129 in position to bridge the two spring members of the switch 106. Upon engagement between the insulated stop member 124 and the plunger 129, the plunger 129 is moved out of engagement with the spring contact members of the switch 106 to open the feed motor circuit.

The adjustable stop 125 comprises a base member 131, which is suitably mounted on the worm gear wheel 115. A plunger member 132, which is similar to the plunger member 129, operates in the base member 131. A spring member 133 is provided for normally forcing the plunger 132 into engagement with the contact spring members of the switch 107. Upon engagement between the insulating stop member 124 and the plunger 132, the circuit through the switch 107 is opened. The spring members 130 and 133 permit sufficient movement of the plungers 129 and 132 to open the circuits through the switches 106 and 107. The adjustable stop 125, which is mounted on the worm wheel 115 is adjusted by means of a hand wheel 134. The hand wheel 134 is connected to the worm gear wheel 115 by any suitable gear connection. For a more complete description of the mechanism for limiting the movement of the feed motor, reference may be had to the copending application of H. L. Blood et al. Serial No. 650,421.

Assuming the traverse switch 34 to be in the feeding position, as shown in Fig. 2 of the drawings, and the pilot switch 13 to be moved towards the right, as shown in Fig. 2 of the drawings, circuits will be completed for operating the main motor to effect a return stroke of the planer table 2. A circuit for energizing the magnet 49 of the unit switch 25 is completed which extends from the supply conductor 69 through the switch blade 62 of the circuit breaker 33, series field magnet winding 21, holding coil 43, contact members 39 and 40, switch arm 37 of the unit switch 24, contact members 79 and 80, which are bridged by the contact segment 70 of the pilot switch 13, magnet 49, coil 61, and the switch blade 63 to the supply conductor 68.

The switch arm 44 of the unit switch 25 is operated to complete a circuit through the main motor 3. The circuit for the main motor 3 extends from the supply conductor 69 through the switch blade 62, series field magnet winding 21, holding coil 43, contact members 39 and 40, switch arm 37, resistor 27, interpole winding 23, armature 20, switch arm 44, contact members 45 and 48, coil 61, and switch blade 63 to the supply conductor 68. The motor 3 is operated in such direction as to effect movement of the planer table 2 towards the left, as shown in Fig. 1 of the drawings.

Upon operation of the unit switch 25, a circuit is completed for operating the accelerating switch 26. The circuit through the magnet 58 of the accelerating switch 26 extends from the supply conductor 69 through the switch blade 62 of the circuit breaker, series field magnet winding 21, magnet 58, contact members 81 and 82, which are bridged by the contact segments 71 and 72, switch arm 44, contact members 45 and 48, coil 61, and the switch blade 63 to the supply conductor 68. The accelerating switch 26 is operated for short circuiting the resistor 27 to accelerate the motor 3.

A circuit for the shunt field magnet winding 22 extends from the supply conductor 69 through the switch blade 62, shunt winding 22, contact members 55 and 65 of the accelerating switch, coil 61, and the switch blade 63 to the supply conductor 68. However, upon operation of the accelerating switch, the circuit of the shunt field magnet winding 22 is changed and extends from the supply conductor 69 through the switch blade 62, shunt winding 22, resistor 29, resistor 28, coil 61, and the switch blade 63 to the supply conductor 68. Inasmuch as the resistors 28 and 29 are included in the circuit of the shunt field magnet winding, it is apparent the speed of the motor is increased to effect a relatively rapid return stroke of the planer table. The switch 52, which normally excludes the resistor 28 from the circuit of the shunt field magnet winding, is opened by the pin 51 which projects from the arm 44 of the unit switch 25.

The pilot switch 13 also completes a circuit for operating the feed motor 12. The circuit through the feed motor extends from the supply conductor 69 through the field magnet winding 89, contact fingers 86 and 87, which are bridged by the contact segment 77, reversing switch 105, switch 107, contact fingers 100 and 101, which are bridged by the contact segment 94, armature 88, contact fingers 102 and 103, which are bridged by the contact segment 95, switch 106, reversing switch 105, and contact fingers 84 and 85, which are bridged by the contact segment 78 to the supply conductor 68. The feeding movement of the motor 12 is continued until the stop member 124 on the feed gear 114 engages one of the stop members 125 and 126. Upon engagement between the stop member 124 and one of the stop members 125 and 126, the feed motor 12 is positively stopped irrespective of the circuit connections of such motor. Moreover, at the same time, the circuit of the feed motor is opened either by the switch 106 or the switch 107 according to whether the stop 126 or the stop 125 is engaged by the stop member 124.

Near the end of the return stroke of the planer table, the dog 15 engages the lever 17 for reversing the position of the pilot switch 13. The circuits through the magnet 49 and the magnet 58 are broken to release the unit switch 25 and the accelerating switch 26. A dynamic braking circuit is completed through the main motor 3, which extends from one terminal of the armature 20 through the interpole winding 23, resistor 27, switch arm 37, contact members 39 and 40, holding coils 43 and 50, contact members 46 and 47, and the switch arm 44 to the other terminal of the armature 20.

In the new position of switch 13, a circuit is completed for operating the unit switch 24 to effect a forward or cutting stroke of the planer table 2. The circuit through the coil 42 of the unit switch 24 extends from the supply conductor 69 through the switch blade 62, series field magnet winding 21, holding coil 50, contact members 46 and 47, switch arm 44, contact members 82 and 83, which are bridged by the contact segment 73, magnet 42, coil 61, and the switch blade 63 to the supply conductor 68. The unit switch 24 is operated for completing a circuit through the main magnet 3. The main magnet 3 is operated in such direction as to effect a movement of the planer table 2 towards the right, as shown in Fig. 1 of the drawings. The circuit through the main motor 3 extends from the supply conductor 69 through the switch blade 62, series field magnet 21, holding coil 50, contact members 46 and 47, switch arm 44, armature 20, interpole winding 23, resistor 27, switch arm 37, contact members 38 and 41, coil 61, and the switch blade 63 to the supply conductor 68. Upon operation of the unit switch 24, a circuit is completed for operating the accelerating switch 26 to short circuit the resistor 27. The circuit through the coil 58 of the accelerating switch extends from the supply conductor 69 through the switch blade 62, series field magnet winding 21, magnet 58, contact members 79 and 81, which are bridged by the contact segments 71 and 72, switch arm 37, contact members 38 and 41, coil 61, and switch blade 63 to the supply conductor 68.

Upon operation of the accelerating switch 26, the direct connection of the shunt field magnet winding 22 across the supply conductors 68 and 69 is opened. The circuit through the shunt field magnet winding 22 is completed from the supply conductor 69 through the switch blade 62, shunt field magnet winding 22, resistor 29, switch 52, coil 61, and the switch blade 63 to the supply conductor 68. Inasmuch as only a portion of the resistor 29 is included in circuit with the shunt field magnet winding 22, the speed of the main motor is reduced during the forward stroke of the table 2.

The pilot switch 13 also completes a circuit for operating the feed motor 12 in a reverse direction. The circuit through the feed motor 12 extends from the supply conductor 69 through the series field magnet winding 89, contact members 84 and 87, which are bridged by the contact segments 74 and 76, reversing switch 105, switch 106, contact segments 102 and 103, which are bridged by the contact segment 95, armature 88, contact fingers 101 and 100, which are bridged by the contact segment 94, switch 107, reversing switch 105, and contact fingers 85 and 86, which are bridged by the contact segment 75 to the supply conductor 68. The feed motor 12 is operated in a reverse direction to effect a feeding movement. Such feeding movement is limited in the manner heretofore set forth by engagement between the stop member 124 and one of the stop members 125 and 126. The circuit of the feed motor 12 is opened as heretofore set forth by engagement of the stop member 124 and one of the stop members 125 and 126.

At the end of the cutting stroke, the dog 14 engages the lever 16 to again change the position of the pilot switch 13 and repeat the above cycle of operations.

In case it is desired to effect traverse operation of the cutting tool, the traverse switch 34 is moved towards the right or left, as shown in Fig. 2 of the drawings, according to the direction of traverse movement desired. Assuming the switch 34 is moved towards the right, as shown in Fig. 2 of the drawings, a circuit is completed through the motor 12 which extends from the supply conductor 69 through the field magnet winding 89, contact fingers 99 and 103, which are bridged by the contact segments 90 and 92, armature 88, and contact fingers 101 and 104, which are bridged by the contact segments 91 and 93, to the supply conductor 68. In the above circuit, it will be noted the pilot switch is excluded from the circuit of the feed motor and accordingly the feed motor is operated continuously and at a relatively rapid rate.

If it is desired to effect traverse operation of the cutting tool in an opposite direction, the traverse switch 34 is moved towards the left, as shown in Fig. 2 of the drawings. A circuit is completed through the feed motor 12 which extends from the supply conductor 69 through the field magnet winding 89, contact fingers 99 and 101, which are bridged by the contact segments 96 and 97, armature 88, and contact fingers 103 and 104, which are bridged by the contact segment 98, to the supply conductor 68.

In the above system it will be noted the pilot switch 13 serves to complete a circuit through the feed motor 12 at each end of the stroke of the planer table 2. Each of the feeding movements of the motor 12 is limited by the engagement between the stop member 124 and one of the stop members 125 and 126. The engagement between the stop member 124 and one of the stop members 125 and 126 serves to open the circuit of the feed motor. The pilot switch also reverses the direction of rotation of the feed motor 12 as well as the direction of rotation of the main motor 3.

A modification of my invention is illustrated in Figs. 7, 8 and 9 wherein the circuit of the feed motor 12 is opened by the movement of the reciprocating work carrying table 2. Inasmuch as the electrical circuits in the modification of my invention are similar to the system shown in Fig. 2 of the drawings, a complete illustration and also an extended description of such circuits will not be given in describing Figs. 7, 8 and 9. In Fig. 7 of the drawings, a portion of the system shown in Fig. 2 is illustrated in order to show the relation to the pilot switch of an auxiliary switch for opening the circuit of the feed motor.

An auxiliary switch 140 is shown in Figs. 7 and 8 in place of the two switches 106 and 107 shown in Figs. 2 and 4 of the drawings. The switch 140 comprises a switch plate 141 which is adapted to bridge the contact members 142 and 143 of the switch when it is in an operative position. The plate is mounted on a rod 144 and is normally held in a released position by means of a spring member 145 which is located between a support 146 and the plate. A roller 147 is mounted on the end of the rod 144.

Referring to Fig. 7 of the drawings, it will be noted the switch 140 is included in the circuit of the feed motor 12 between the pilot switch 13 and the traverse switch 34 and that it is impossible to operate the feed motor by the pilot switch unless the plate 141 bridges the contact members 142 and 143. Traverse operation of the feed motor 12 by the traverse switch 34 may be effected irrespective of the position of the switch 140.

Suitable dogs 148 and 149 are provided not only for operating the switch 140 but also for operating the pilot switch 13. The dog 149 is provided with two projecting lugs 150 and 151 and the dog 148 is provided with two projecting lugs 152 and 153. The projecting lugs 150 and 152 on the dogs are adapted to engage the roller 147 and effect operation of the auxiliary switch 140. The lugs 151 and 153 are adapted to engage the levers 16 and 17 and effect operation of the pilot switch 13 in the usual manner.

It will be noted that it is impossible to operate the feed motor 12 by the pilot switch 13 unless the roller 147 on the auxiliary switch is in engagement with the lug 150 on the dog 149 or is in engagement with the lug 152 on the dog 148. Referring to Fig. 9 of the drawings, it will be noted the lug 150 is of different length than the lug 151 and that the lug 152 is of different length from the lug 153. The lugs are provided in different lengths in order to vary the time at which the feeding operation is effected. The lugs 151 and 150 on the dog 149 operate the pilot switch and the auxiliary switch to effect a cutting stroke by the planer. Thus, at the end of the return stroke, the lug 150 engages the roller 147 at substantially the same time as the lug 151 engages the lever 17. Consequently the switch 140 is closed when the pilot switch is operated and accordingly a feeding movement is effected promptly at the end of the return stroke. When the cutting stroke is started and the planer table is moved toward the right, as shown in Figs. 8 and 9 of the drawings, the lug 150 disengages the roller 147 and releases the switch 140 to open the circuit of the feed motor 12.

At the end of the cutting stroke the lug 153 first engages the lever 16 for operating the pilot switch and after such operation the lug 152 engages the roller 147 for operating the switch 140. The feeding operation of the motor 12 is thus delayed at the end of the cutting stroke in order to allow a limited amount of over-travel and prevent any feeding movement when the cutting tool is still in engagement with the work. Upon movement of the table towards the left, as shown in Figs. 7 and 8 of the drawings, the dog 152 disengages the roller 147 for releasing the switch 140 to open the circuit of the motor 12.

Modifications in the system and in the arrangement and location of parts may be made within the spirit and scope of my invention and such modifications are intended to be covered by the appended claims.

What I claim is:

1. In a control system for a machine tool, the combination with a member moved periodically in opposite directions and a motor, of automatic means comprising stop members for fixedly stopping the motor rotation and for simultaneously opening the motor circuit before the end of each movement of said member, and means automatically controlled by the moving member for completing the circuit of the motor in a reverse direction at the end of each movement of the moving member.

2. In a control system for a machine tool, the combination with a reciprocating member, and a feed motor for effecting feeding and traversing movements of the tool on the machine, of automatic means comprising stop members for fixedly stopping the feeding movements and for simultaneously opening the motor circuit before the end of the stroke of the reciprocating member, and means for completing the circuit of the motor in a reverse direction at the end of the stroke of the reciprocating member.

3. In a control system for a machine tool, the combination with a reciprocating member, a motor, and a pilot switch for operating said motor in accordance with the operation of the reciprocating member, of automatic means comprising stop members for fixedly stopping the motor rotation and for simultaneously opening the motor circuit before the end of each movement of said member and prior to the change in the motor connections by the pilot switch at each end of the stroke of the reciprocating member.

4. In a control system for a machine tool, the combination with a reciprocating member, and a motor, of means comprising stop members for fixedly stopping the motor rotation and for opening the motor circuit before each end of the stroke of the reciprocating member, and means controlled by the reciprocating member for completing the circuit of the motor in a reverse direction at each end of the stroke of the reciprocating member.

5. In a control system for a machine tool, the combination with a reciprocating member, a feed motor for feeding and traversing the tool on the machine, and a pilot switch for reversing the direction of rotation of the feed motor in accordance with the movement of the reciprocating member, of means comprising a fixed and an adjustable stop member for fixedly stopping the motor and for opening the circuit thereof irrespective of the position of the pilot switch and prior to the reversal of the motor connections by the pilot switch.

6. In a control system for a machine tool, the combination with a reciprocating member, a motor, and a pilot switch for operating the motor in accordance with the movement of the reciprocating member, of means comprising stop members for fixedly stopping the motor rotation before the end of the stroke of the reciprocating member and for opening the motor circuit irrespective of the position of the pilot switch, said pilot switch at the end of the stroke of the reciprocating member serving to close the motor circuit.

7. In a control system for a machine tool, the combination with a reciprocating member, a main motor for operating the reciprocating member, a feed motor for effecting feeding and traversing movements of the tool on the machine, and a pilot switch for operating the main and the feed motor in accordance with the operation of the reciprocating member, of means comprising stop members for fixedly stopping the feed motor before the end of the stroke of the reciprocating member and for opening the feed motor circuit irrespective of the position of the pilot switch, said pilot switch at the end of the stroke of the reciprocating member serving to close the feed motor circuit for operating such motor in a reverse direction.

8. In a control system for a machine tool, the combination with a reciprocating member, a feed motor for effecting feeding and traversing movements of the tool on the machine, a pilot switch controlled by the reciprocating member for reversing the feed motor connections at each end of the stroke of the reciprocating member, and a traverse switch for connecting the feed motor in circuit with the pilot switch and for effecting traverse operation of the motor independent of the pilot switch, of mechanical means for stopping the motor and for opening the motor circuit before each end of the stroke of the reciprocating member and prior to the reversal of the motor connections by the pilot switch.

9. In a control system for a machine tool, the combination with a reciprocating member, a main motor for operating the reciprocating member, a feed motor for effecting feeding and traversing movements of the tool on the machine, a pilot switch operated by the reciprocating member for controlling the main motor and for reversing the feed motor connections at each end of the stroke of the reciprocating member, and a traverse switch for connecting the feed motor in circuit with the pilot switch and for effecting traverse operation of the feed motor independent of the pilot switch, of mechanical means for stopping the feed motor and for opening the feed motor circuit before each end of the stroke of the reciprocating member and prior to the reversal of the feed motor connections by the pilot switch.

10. In a control system for a machine tool, the combination with a reciprocating member, a main motor for operating the reciprocating member, a feed motor, and a pilot switch operated by the reciprocating member for controlling the direction of rotation of the main and the feed motor in accordance with the operation of the reciprocating member, of means comprising stop members for fixedly stopping the feed motor and for simultaneously opening the feed motor circuit prior to the change in the feed motor connections by the pilot switch at each end of the stroke of the reciprocating member.

11. In a control system for a machine tool, the combination with a reciprocating member, a main motor for operating the reciprocating member, a feed motor, and a pilot switch operated by the reciprocating member for controlling the main and the feed motor in accordance with the operation of the reciprocating member, of means comprising stop members for fixedly stopping the feed motor and for opening the feed motor circuit before the end of each stroke of the reciprocating member and prior to the reversal of the feed motor connections by the pilot switch.

12. In a control system, the combination with a reciprocating member, a main motor for operating the reciprocating member, and an auxiliary motor, of means comprising stop members for fixedly stopping the auxiliary motor and for opening the auxiliary motor circuit before the end of the stroke of the reciprocating member, and means operated by the reciprocating member at the end of the stroke thereof for reversing the direction of rotation of the main motor and for completing the circuit of the auxiliary motor to reverse the direction of rotation thereof.

In testimony whereof, I hereto affix my signature.

ROSWELL H. RAUSCH.